United States Patent
Böhm

(10) Patent No.: US 12,242,858 B2
(45) Date of Patent: Mar. 4, 2025

(54) METHOD FOR STARTING A SYSTEM-ON-A-CHIP WITHOUT READ ONLY MEMORY, SYSTEM ON-A- CHIP WITHOUT READ ONLY MEMORY AND HEADPHONE

(71) Applicant: ams AG, Premstätten (AT)

(72) Inventor: Michael Böhm, Graz (AT)

(73) Assignee: AMS AG, Premstätten (AT)

( * ) Notice: Subject to any disclaimer, the term of this patent is extended or adjusted under 35 U.S.C. 154(b) by 73 days.

(21) Appl. No.: 17/785,563

(22) PCT Filed: Dec. 15, 2020

(86) PCT No.: PCT/EP2020/086143
§ 371 (c)(1),
(2) Date: Jun. 15, 2022

(87) PCT Pub. No.: WO2021/122543
PCT Pub. Date: Jun. 24, 2021

(65) Prior Publication Data
US 2023/0015614 A1    Jan. 19, 2023

(30) Foreign Application Priority Data
Dec. 18, 2019  (EP) .................................... 19217461

(51) Int. Cl.
*G06F 9/4401*  (2018.01)
*G06F 9/448*  (2018.01)
(Continued)

(52) U.S. Cl.
CPC .......... *G06F 9/4403* (2013.01); *G06F 9/4498* (2018.02); *G06F 11/3024* (2013.01); *G06F 15/781* (2013.01)

(58) Field of Classification Search
None
See application file for complete search history.

(56) References Cited

U.S. PATENT DOCUMENTS

| 2007/0174602 A1 | 7/2007 | Kao |
| 2009/0228711 A1* | 9/2009 | Lim ........................ G06F 21/71 713/182 |

(Continued)

FOREIGN PATENT DOCUMENTS

| CN | 101051275 A | 10/2007 |
| CN | 110389787 A | 10/2019 |
| EP | 1085409 | * 3/2001 |

OTHER PUBLICATIONS

Dagan, "Designing The DiskOnChip as a Flash Disk & Boot Device Replacement", Application Note: AP-DOC-047, Jan. 2001, 13 pages.

(Continued)

*Primary Examiner* — Fahmida Rahman
(74) *Attorney, Agent, or Firm* — MH2 Technology Law Group LLP

(57) ABSTRACT

A method for starting a system-on-a-chip, SoC, without read only memory, ROM, comprises the steps of receiving, by a processor comprised by the SoC, a reset signal, monitoring, by a monitoring component comprised by the SoC, a connection between the processor and at least a non-volatile memory, both comprised by the SoC, upon occurrence of a first read access of the processor to the non-volatile memory via the connection checking, by the monitoring component, whether a data value returned in response to the first read access via the connection conforms to a pre-set value, and if the returned data value differs from the pre-set value, stopping, by the monitoring component, operation of the processor.

14 Claims, 3 Drawing Sheets

(51) Int. Cl.
    *G06F 11/30*     (2006.01)
    *G06F 15/78*     (2006.01)

(56) References Cited

U.S. PATENT DOCUMENTS

| | | | |
|---|---|---|---|
| 2012/0017071 A1 | 1/2012 | Shahar et al. | |
| 2012/0284498 A1* | 11/2012 | Chou | G06F 12/0638 713/2 |
| 2014/0281464 A1 | 9/2014 | Le et al. | |
| 2016/0147545 A1* | 5/2016 | Jain | G06F 11/008 713/100 |
| 2016/0232047 A1 | 8/2016 | Bates et al. | |
| 2017/0249161 A1 | 8/2017 | Le et al. | |
| 2019/0324761 A1 | 10/2019 | Choi et al. | |
| 2023/0015614 A1 | 1/2023 | Böhm | |

OTHER PUBLICATIONS

Kusnierczak, Pawel (EP Authorized Officer), International Search Report and Written Opinion in corresponding International Application No. PCT/EP2020/086143 mailed on Mar. 12, 2021, 12 pages.
Extended European Search Report in corresponding EP Application No. 19217461.3 mailed on Jul. 15, 2020, 9 pages.
European Examination Report dated Feb. 7, 2023, EP Application No. 19217461.3, 10 pages.
Chinese Office Action issued in corresponding Chinese Patent Application No. 202080088494.7 dated Jun. 17, 2024, with English language translation, 11 pages.

\* cited by examiner

METHOD FOR STARTING A SYSTEM-ON-A-CHIP WITHOUT READ ONLY MEMORY, SYSTEM ON-A- CHIP WITHOUT READ ONLY MEMORY AND HEADPHONE

CROSS-REFERENCE TO RELATED APPLICATIONS

The present application is the national stage entry of International Patent Application No. PCT/EP2020/086143, filed on Dec. 15, 2020, and published as WO 2021/122543 A1 on Jun. 24, 2021, which claims the benefit of priority of European Patent Application No. 19217461.3, filed on Dec. 18, 2019, all of which are incorporated by reference herein in their entireties.

FIELD OF THE INVENTION

The present disclosure relates to the field of system-on-a-chip, SoC. Specifically it relates to the field of SoCs without read only memory, ROM, which are also called ROM-less SoCs. More specifically, the application is directed to a method for starting a system-on-a-chip without ROM, system-on-a-chip without ROM and headphone.

BACKGROUND OF THE INVENTION

As integrated circuit technology has advanced, the number of features that can be incorporated onto an integrated circuit chip has increased. An integrated circuit chip on which a processor, an on-chip memory, and other components are provided can be referred to as a system-on-a-chip, SoC, device. An SoC device can refer generally to any chip including an integrated circuit die or an arrangement of dies that is or are encapsulated within a package, and on which at least a processor and an on-chip memory are provided. An on-chip memory refers to a memory device that is mounted in the same chip as the processor and possibly other components.

In the state of the art different kinds of SoCs exist. On the one hand, SoCs have an on-chip ROM and a flash memory. On the other hand there are ROM-less SoCs which just have a flash memory. In virgin SoCs, i.e. directly after their production and before testing a content of the flash memory, the flash memory may be in an unprogrammed and consequently undefined state. Potential execution of such uninitialized program code in flash memories can lead to unexpected behaviour and in the worst case this may inhibit the flash from being programmed during the first test after production. A known workaround for this problem is to start the SoC's processor from the on-chip boot ROM, for example by means of a boot loader implemented in the ROM, which verifies the validity of the flash memory's content before executing the processor using instructions stored in the flash memory. However, such a solution is not applicable to ROMless SoCs.

An object of the present disclosure can therefore be seen in providing a method for starting an SoC without ROM and an SoC without ROM, as well as a headphone, which avoid execution of uninitialized program code stored in flash memory of the SoC.

The object is achieved by the subject-matter of the independent claims. Embodiments and developments are defined in the dependent claims.

SUMMARY OF THE INVENTION

In one embodiment a method for starting an SoC without ROM comprises the following steps:
receiving, by a processor comprised by the SoC, a reset signal,
monitoring, by a monitoring component comprised by the SoC, a connection between the processor and at least a non-volatile memory, both comprised by the SoC,
upon occurrence of a first read access of the processor to the non-volatile memory via the connection checking, by the monitoring component, whether a data value returned in response to the first read access via the connection conforms to a pre-set value, and
if the returned data value differs from the pre-set value, stopping, by the monitoring component, operation of the processor.

As soon as the processor receives a reset signal from the outside, the monitoring component starts operation and observes the connection between the processor and the non-volatile memory. When the monitoring component detects the first read access of the processor to the memory, the monitoring component checks whether the data value returned in response to the first read access matches the pre-set value. In the case that the returned value differs from the pre-set value, i.e. an expected value, the monitoring component stops operation of the processor.

Determining that the data value returned in response to the first read access differs from the pre-set value is an indication for the presence of uninitialized code in the non-volatile memory. Therefore, by stopping operation of the processor following such determination, execution of uninitialized code stored in the non-volatile memory, e.g. flash memory, by the SoC's processor is avoided. Consequently, the advantages of a ROMless SoC having reduced chip area due to elimination of the ROM, reduced system start-up time and reduced test time can be leveraged to their full extent.

The definitions of terms provided in the above also apply to the following text, unless stated otherwise.

The non-volatile memory may also be called persistent memory. It retains its stored content even if power is removed from the non-volatile memory.

The processor of the SoC may also be referred to as a microprocessor or a central processing unit, CPU. The processor may be realized, for instance, by an ARM processor. The notion of starting here refers to the first putting into operation of the described SoC without ROM, i.e. ROMless SoC, directly after its production.

In a development stopping, by the monitoring component, operation of the processor comprises discarding, by the monitoring component, the returned data value and providing, by the monitoring component, a machine executable instruction to the processor which causes the processor to cease operation.

In the case that invalid memory content has been detected during the first read access, the returned data value is replaced by an instruction that halts the processor. It is consequently ensured that invalid code of the non-volatile memory is prohibited from execution on the processor.

In a development the first read access of the processor is addressed to address zero in the non-volatile memory.

The first read access is therefore identified by being directed to address zero in the non-volatile memory and is clearly recognized by the monitoring component.

In an embodiment the pre-set value represents an initial stack pointer value used by the processor.

It is established practice with SoCs that a data value returned in response to the first read access of the processor in normal operation is an initialization value of the stack pointer.

In a development the initial stack pointer value is equal to an address of the last word of a volatile memory comprised by the SoC. In particular the initial stack pointer value is equal to 0x2001FFFC.

As known to those skilled in the art, every SoC and also the described SoC has a volatile memory, e.g. a random access memory, RAM, which has a known size, for instance 128 kB. In an implementation, said RAM is mapped to a defined address in the memory of the processor. The stack pointer points to the last word in the RAM memory embedded in the SoC. In an exemplary design, the default stack pointer initialization value is 0x2001FFFC.

In a development the method further comprises:

if the returned value coincides with the pre-set value, continuing operation of the processor.

In the case that the returned value is the correct initial stack pointer value, the processor continues operation.

The described method ensures that when starting an SoC for the first time after its production, execution of uninitialized, i.e. undefined, random code which might be in the non-volatile memory of the SoC is prohibited from being executed by the processor. This not only applies to erased memory cells having the value F but also, and more importantly, to random values.

In one embodiment a SoC without ROM comprises a processor, a non-volatile memory, a connection and a monitoring component. The connection is prepared to connect the processor and at least the non-volatile memory. The processor is prepared to receive a reset signal and to perform at least one read access to the non-volatile memory via the connection. The monitoring component is prepared to monitor the connection between the processor and the non-volatile memory, and upon occurrence of a first read access of the processor to the non-volatile memory to check whether a data value returned in response to the first read access via the connection conforms to a pre-set value, and if the returned data value differs from the pre-set value, to stop operation of the processor.

After receipt of the reset signal from outside the SoC, the processor performs a first read access to the non-volatile memory using the connection. The monitoring component monitors said connection and detects the first read access. It subsequently checks whether the data value returned in response to the first read access matches the pre-set value. If it determines that the returned value differs from the pre-set value, the monitoring component stops operation of the processor.

The monitoring component consequently identifies invalid code in the non-volatile memory during the first read access of the processor of a ROMless SoC directly after its production. In such a case further operation of the processor is stopped. Execution of invalid and uninitialized code in the non-volatile memory is consequently prohibited.

The method described in the above may be implemented within the claimed SoC.

In a development the connection is realized as a bus connection between an instruction port of the processor and the non-volatile memory.

The bus connection may be a point-to-point connection. The bus can thereby be realized in a basic manner, having just one slave and one master, without arbitration and coding/decoding. In case that an ARM processor is employed to realize the SoC's processor, an advanced high performance bus, AHB, can be used as a bus connection, for example. Optionally, the bus has more than one slave and/or more than one master.

In a development, the non-volatile memory is realized as a flash memory.

The flash memory is embedded in the SoC and is programmed with a firmware image in the course of the SoC first starting after its production, when the monitoring component determines that the returned value matches the pre-set value and operation of the processor continues.

In a development the monitoring unit comprises a finite state machine and a multiplexer component. The finite state machine is prepared to start operating upon occurrence of the reset signal, to control the multiplexer component, to receive at least the returned data value from the connection, to evaluate the returned data value received from the connection and therefrom determine whether a first read access from the processor to the non-volatile memory has occurred and whether the returned data value conforms to the pre-set value, and if it is determined that the first read access occurred and the returned data value does not match the pre-set value, the finite state machine is prepared to provide a replacement value to the multiplexer component. The multiplexer component is prepared to receive the replacement value and to receive the data value from the connection and under control of the finite state machine to provide either the returned data value received from the connection or the replacement value via the connection to the processor.

By means of the finite state machine and the multiplexer component the replacement value is provided to the processor in the case that the returned data value does not match the pre-set value which is the expected initial value of the stack pointer. Otherwise, if the returned data value is the expected initial stack pointer value, the returned data value is provided to the processor.

In a development the replacement value comprises a machine executable instruction which causes the processor to halt. Consequently, in response to a first read access which would provide invalid code, the processor receives an instruction which stops the processor's operation. Said machine executable instruction may send the processor to sleep, for example, by means of a wait-for-event instruction.

In a development the processor is prepared to perform calculations for audio processing, in particular for noise cancellation.

The SoC is consequently designed for use in audio applications and therefore is ready for audio processing, especially noise cancellation.

In one embodiment a headphone has the SoC as defined above.

The headphone, besides state of the art components known to those skilled in the art e.g. a speaker, a feedforward microphone and an error microphone, employs the ROMless SoC as defined above, for instance for performing noise cancellation. The headphone consequently enjoys the advantages of the ROMless SoC, i.e. reduced chip area, test time and system startup time, and at the same time avoids firmware execution on the processor embedded in the SoC, in case the firmware image is not valid. Noise cancellation is also referred to as active noise cancellation or ambient noise cancellation, both abbreviated with ANC. ANC generally makes use of recording ambient noise that is processed, for instance by the processor of the SoC, for generating an anti-noise signal, which is then combined with a useful audio signal to be played over a speaker of the headphone.

In a development the headphone is realized as one of in-ear headphone, on-ear headphone or over-ear headphone.

The text below explains the proposed method for starting an SoC without ROM, the proposed SoC without ROM and the proposed headphone in detail using exemplary embodiments with reference to the drawings. Components and circuit elements that are functionally identical or have the identical effect bear identical reference numbers. In so far as circuit parts or components correspond to one additional in function, a description of them will not be repeated in each of the following figures.

DETAILED DESCRIPTION

Figure 1:
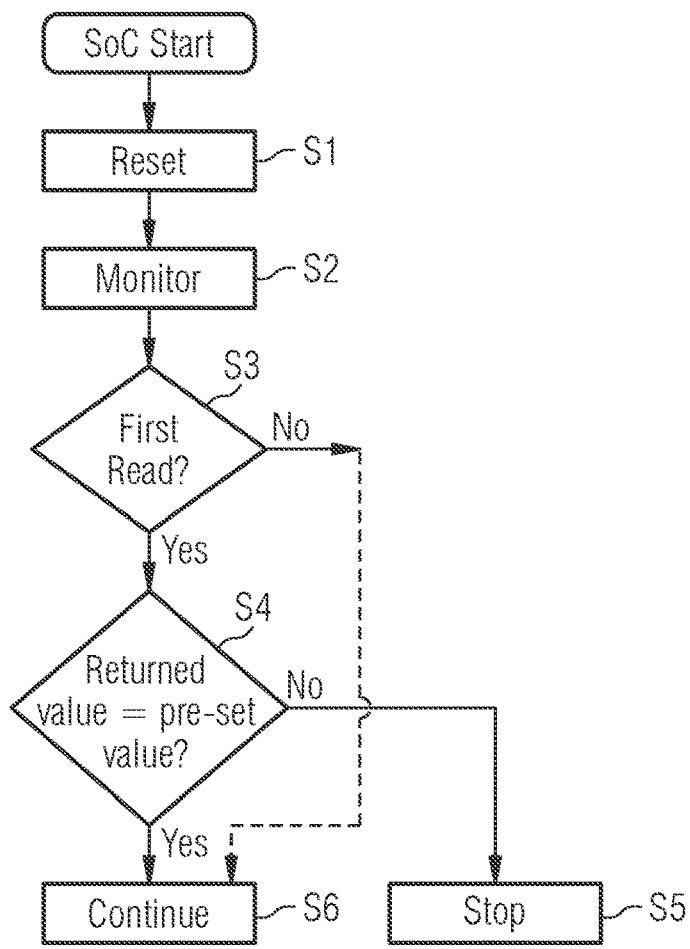
FIG. 1 shows an embodiment example of the method for starting a SoC without ROM as proposed.

FIG. 1 shows an embodiment example of the method for starting an SoC without ROM as proposed. The method comprises the following steps:
- receiving in step S1, by a processor comprised by the SoC, a reset signal,
- monitoring in step S2, by a monitoring component comprised by the SoC, a connection between the processor and a non-volatile memory, both comprised by the SoC,
- if a first read access of the processor to the non-volatile memory via the connection is positively detected by the monitoring component in step S3, checking in step S4, by the monitoring component, whether a data value returned in response to the first read access via the connection conforms to a pre-set value, and
- if the returned data value differs from the pre-set value, stopping in step S5, by the monitoring component, operation of the processor.

By means of the proposed method as depicted in FIG. 1, execution of invalid code stored in a non-volatile memory of a ROMless SoC is avoided during a first start of the SoC which just has been manufactured and is powered on by means of the reset signal for the first time. The monitoring component listens to the connection extending between the processor and at least the non-volatile memory of the SoC for the first read access of the processor and breaches said connection in order to double-check the returned data value for conformance with the pre-set value. In the case that the returned data value does not match the pre-set value, operation of the processor is stopped by the monitoring component and invalid code is prevented from being executed. Optionally, the method further comprises step S6 in which operation of the processor continues in case the returned data value coincides with the pre-set value.

Figure 2:
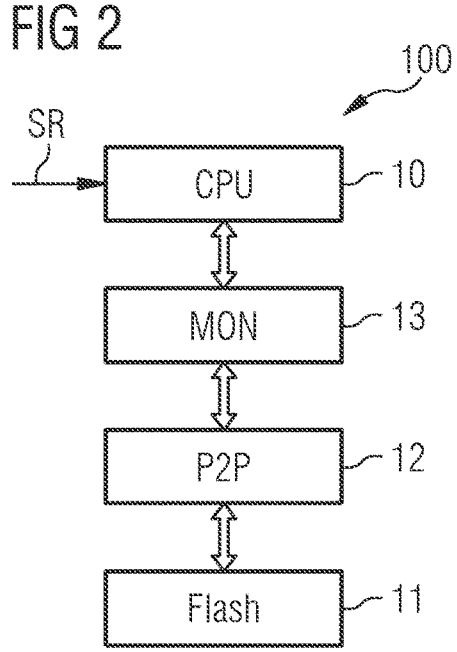
FIG. 2 shows a first embodiment example of the SoC without ROM as proposed.

FIG. 2 shows a first embodiment example of the SoC without ROM as proposed. The SoC 100 comprises a processor 10, a non-volatile memory 11, a connection 12 which is prepared to connect the processor 10 and at least the non-volatile memory 11, and a monitoring component 13. The processor 10 is prepared to receive a reset signal SR and to perform at least one read access to the non-volatile memory 11 via the connection 12. The monitoring component 13 is prepared to monitor the connection 12 between the processor 10 and the non-volatile memory 11. In detail, upon occurrence of the first read access of the processor 10 to the non-volatile memory 11, the monitoring component 13 is prepared to check whether a data value returned in response to the first read access via the connection 12 conforms to a pre-set value. If the returned data value differs from the pre-set value, the monitoring component 13 is prepared to stop operation of the processor 10.

In an implementation example the connection 12 is realized as a bus connection connecting an instruction port of the processor 10 and the non-volatile memory 11 which is realized as flash memory and represents the instruction memory of the SoC. The connection 12 may therefore be referred to as the instruction bus of the processor 10.

In an exemplary implementation said instruction bus may operate according to the AHB protocol. Determination of a first read access by the processor 10 is effected by either counting the read accesses on the instruction bus or by checking the involved address. In the case that an ARM processor is used for implementing processor 10, the first instruction bus access happens from address zero. In most applications employing ARM processors, the pre-set value which conforms to the expected value returned by the system which is loaded from flash memory is pointing to the last word in a volatile memory, a RAM memory, which is also embedded in the SoC. In an exemplary design, the RAM is mapped to address 0x20000000 according to the recommended memory mapping of the processor vendor and has a size of 128 kB. Therefore, the pre-set value which is the expected value for stack pointer initialization is 0x2001FFFC. The value which is returned from address zero is checked by the monitoring component 13. If this value is different from the expected initialization value of the stack pointer, the monitoring component 13 stops further operation of the processor, thereby avoiding execution of invalid code coincidentally contained in the flash memory 11.

Figure 3:
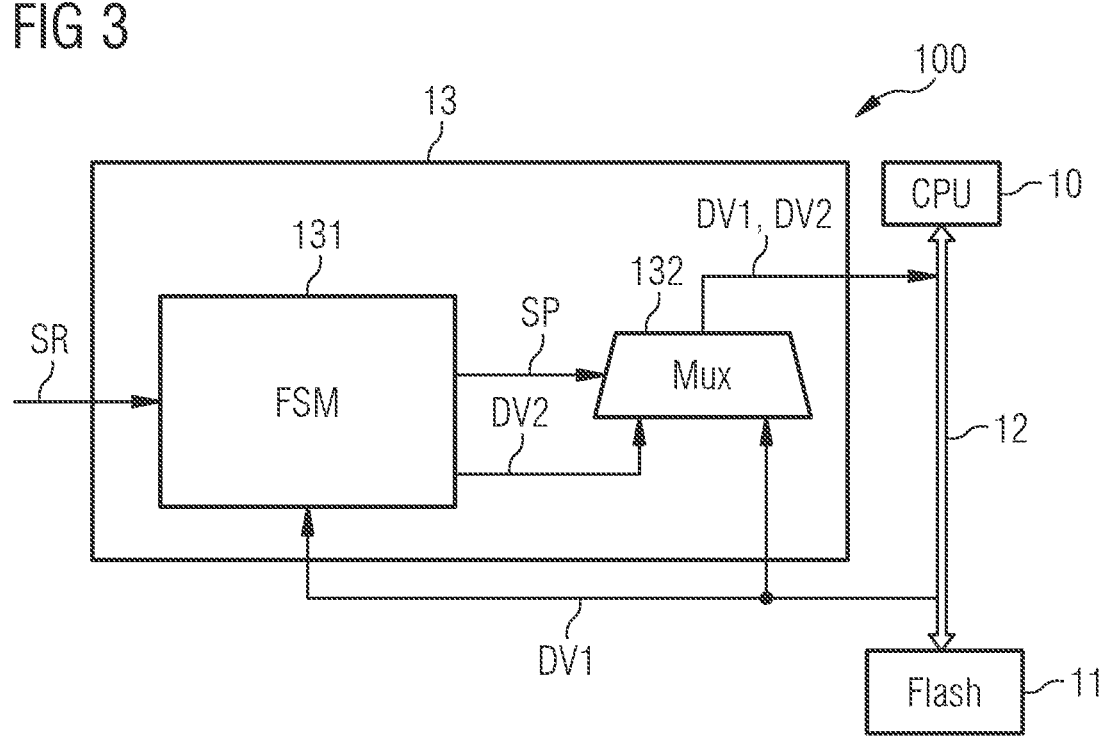
FIG. 3 shows a second embodiment example of the SoC without ROM as proposed.

FIG. 3 shows a second embodiment example of the SoC without ROM as proposed. The embodiment of FIG. 3 coincides with the embodiment of FIG. 2 and shows possible components of the monitoring component 13 in more detail. The monitoring component 13 comprises a finite state machine 131 and a multiplexer component 132. The finite state machine 131 is prepared to start operating upon occurrence of the reset signal SR. It is further operable to control the multiplexer component 132 by means of a control signal SP. The finite state machine 131 is also operable to receive at least the returned data value DV1 from the connection 12, to evaluate the returned data value DV1 and therefrom determine whether a first read access from the processor 10 to the non-volatile memory 11 has occurred and whether the returned data value DV1 conforms to the pre-set value. If it is determined within the finite state machine 131 that the first read access occurred and the returned data value DV1 does not match the pre-set value, the finite state machine 131 is operable to provide a replacement value DV2 to the multiplexer component 132. The multiplexer component 132 is prepared to receive the replacement value DV2 from the finite state machine 131 and to receive the returned data value DV1 from the connection 12. According to the control signal SP provided by the finite state machine 131, the multiplexer component 132 either provides the returned data value DV1 or the replacement value DV2 to the processor 10 using the connection 12.

Consequently, if it is detected by the finite state machine 131 that the returned data value DV1 does not match the pre-set value, the finite state machine 131 provides the replacement value DV2 to the multiplexer component 132 and instructs the multiplexer component 132 by means of control signal SP to provide said replacement value DV2 to the processor 10. The replacement value DV2 contains, for instance, a machine executable instruction which sets the processor 10 to sleep. In an implementation example the monitoring component 13 in that manner replaces subsequent vector fetches by 0x00010001, wherein the trailing 1 indicates some code in the given SoC processor and replaces instruction fetches from address 0x00010000 with instructions which halt the processor, for instance a wait for event instruction.

Figure 4:
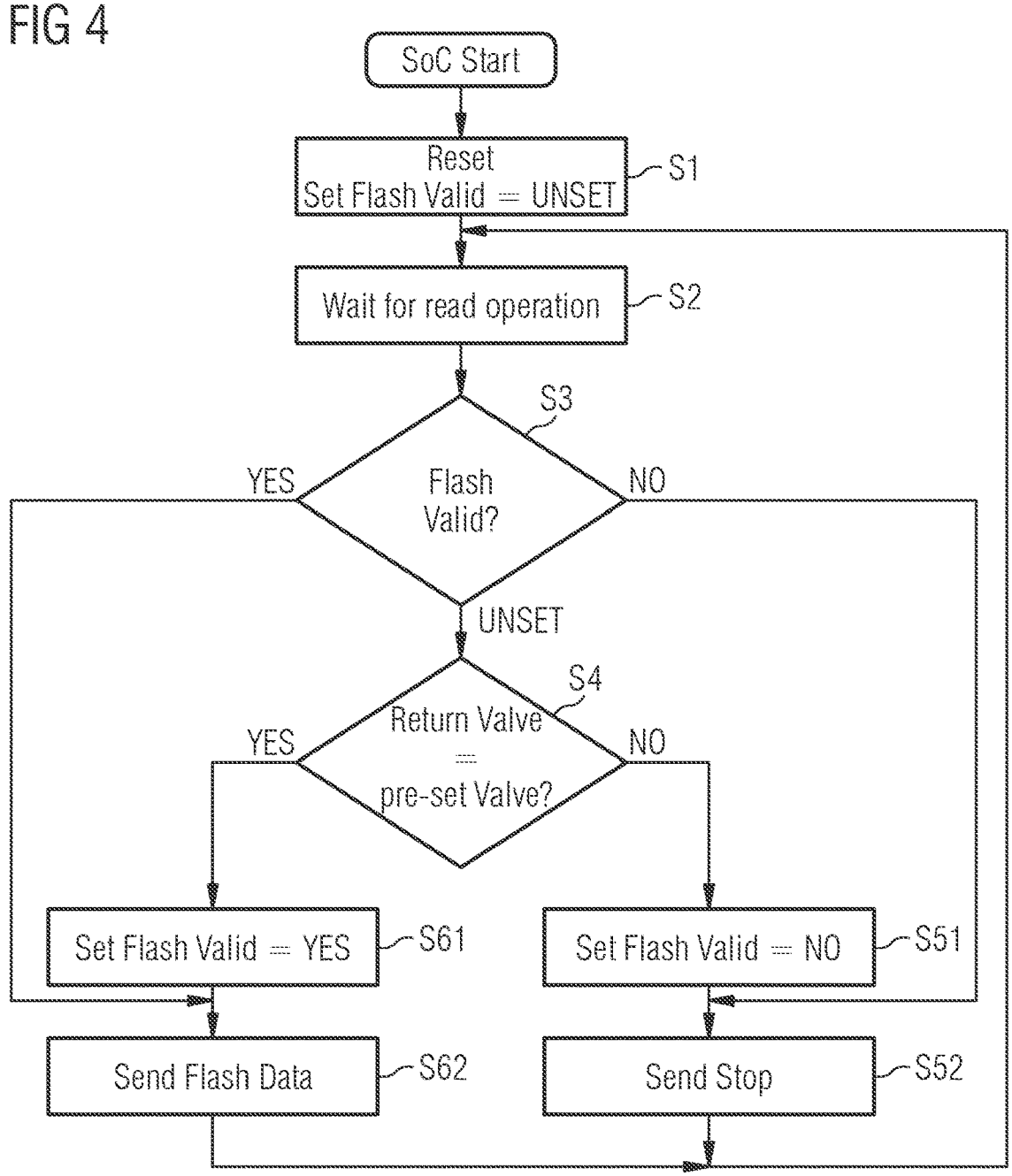
FIG. 4 shows another embodiment example of the method for starting a SoC without ROM as proposed.

FIG. 4 shows another embodiment example of the method for starting a SoC without ROM as proposed. The embodiment coincides with the embodiment described above with reference to FIG. 1 and can be regarded as an implementation example of the finite state machine described earlier with reference to FIG. 3. In step S1, upon receipt of the reset signal a state variable called FlashValid is initialized as "UNSET", i.e. FlashValid then has the value "UNSET". The variable FlashValid indicates whether or not a first read access occurred and whether or not the returned data value conforms to the pre-set value. It may be implemented as known to those skilled in the art, for example by using at least two bits.

In step S2 the connection between the processor and the non-volatile memory is monitored, thereby waiting for a read operation or read access occurring on said connection.

In step S3, when such read operation occurred, the value of the variable FlashValid is checked, in order to determine whether this read operation in fact was the first read access of the processor to the non-volatile memory occurred. In case the value of the FlashValid variable is "UNSET", the read operation indeed is the first read access and step S4 is executed subsequently. In step S4 it is checked whether a data value called here "ReturnValue", which is the data value returned in response to the first read access via the connection, conforms to the pre-set value. If this check proves yes, operation of the processor continues. Therein, in step S61 the variable FlashValid is set to "Yes" and in step S62 the data value read from the Flash memory is propagated to the processor, because said value has been determined to be valid. In case the check in step S4 proves no, i.e. the "ReturnValue" returned in response to the first read access differs from the pre-set value, the method proceeds with stopping operation of the processor. In detail, in step S51 the variable FlashValid is set to "No" and in step S52 the replacement value is provided to the processor which stops operation of the processor.

Furthermore, in case it is determined in step S3 that the value of the FlashValid variable is "Yes", the method directly proceeds to step S62 and sends the value read from flash memory to the processor, because the previous read operation was not the first read access and the content of the Flash memory has already been approved in a previous iteration of the method.

In case it is determined in step S3 that the value of the FlashValid variable is "No", the current read operation is not the first read access and the content of the Flash has already been evaluated as invalid. The method continues with step S52 and further operation of the processor is stopped.

Figure 5:
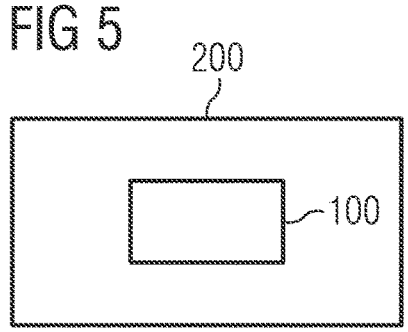
FIG. 5 shows an embodiment example of the headphone as proposed.

FIG. 5 shows an embodiment example of the headphone as proposed. The headphone 200 comprises the SoC 100. The SoC 100 conforms to one of the embodiments described above, wherein the processor 10 is specially configured to perform calculations for audio processing. In particular, the audio processing is directed to noise cancellation.

The headphone 200 can thereby be realized in various forms as one of in-ear headphone, also known as ear-phone, an on-ear headphone, also known as supra-aural headphone, or an over-ear headphone also known as circumaural headphone. In-ear headphones are worn like earbuds. On-ear headphones have pads that press against the ears, while over-ear headphones have circular or ellipsoid earpads that encompass the ears.

It is to be understood that any feature described in relation to any one embodiment may be used alone, or in combination with other features described, and may also be used in combination with one or more features of any other of the embodiments, or any combination of any other of the embodiments unless described as alternative. Furthermore, equivalents and modifications not described above may also be employed without departing from the scope of the method for starting an SoC without ROM and SoC without ROM as defined in the accompanying claims.

The invention claimed is:

1. A method for starting a system-on-a-chip, SoC, without read only memory, ROM, comprising:
    receiving, by a processor comprised by the SoC, a reset signal,
    monitoring, by a monitoring component comprised by the SoC, a connection between the processor and at least a non-volatile memory, both comprised by the SoC,
    checking, by the monitoring component, upon occurrence of a first read access of the processor to the non-volatile memory via the connection whether a data value returned in response to the first read access via the connection conforms to a pre-set value, wherein the first read access is the first read access of the processor directly after production of the SoC, and
    if the returned data value differs from the pre-set value, stopping, by the monitoring component, operation of the processor,
    wherein the monitoring component comprises a finite state machine and a multiplexer component,
    wherein the finite state machine is configured to start operating upon occurrence of the reset signal, to control the multiplexer component, to receive at least the returned data value from the connection, to evaluate the returned data value received from the connection and therefrom determine whether the first read access from the processor to the non-volatile memory has occurred and whether the returned data value conforms to the pre-set value, and if it is determined that the first read access occurred and the returned data value does not match the pre-set value, the finite state machine is configured to provide a replacement value to the multiplexer component, and
    wherein the multiplexer component is configured to receive the replacement value and to receive the returned data value from the connection and under control of the finite state machine to provide either the returned data value received from the connection or the replacement value via the connection to the processor.

2. The method according to claim 1,
    wherein stopping, by the monitoring component, operation of the processor comprises discarding, by the monitoring component, the returned data value and providing, by the monitoring component, a machine executable instruction to the processor which causes the processor to cease operation.

3. The method according to claim 1,
wherein the first read access of the processor is addressed to address zero in the non-volatile memory.

4. The method according to claim 1,
wherein the pre-set value represents an initial stack pointer value used by the processor.

5. The method according to claim 4,
wherein the initial stack pointer value is equal to an address of the last word of a volatile memory comprised by the SoC.

6. The method according to claim 1,
further comprising
if the returned data value coincides with the pre-set value, continuing operation of the processor.

7. A system-on-a-chip, SoC, without read only memory, ROM, comprising
a processor,
a non-volatile memory,
a connection which is configured to connect the processor and at least the non-volatile memory, and
a monitoring component,
wherein the processor is configured to receive a reset signal and to perform at least one read access to the non-volatile memory via the connection,
wherein the monitoring component is configured to monitor the connection between the processor and the non-volatile memory, and upon occurrence of a first read access of the processor to the non-volatile memory to check whether a data value returned in response to the first read access via the connection conforms to a pre-set value, and if the returned data value differs from the pre-set value, to stop operation of the processor, and
wherein the first read access is the first read access of the processor directly after production of the SoC,
wherein the monitoring component comprises a finite state machine and a multiplexer component,
wherein the finite state machine is configured to start operating upon occurrence of the reset signal, to control the multiplexer component, to receive at least the returned data value from the connection, to evaluate the returned data value received from the connection and therefrom determine whether the first read access from the processor to the non-volatile memory has occurred and whether the returned data value conforms to the pre-set value, and if it is determined that the first read access occurred and the returned data value does not match the pre-set value, the finite state machine is configured to provide a replacement value to the multiplexer component, and
wherein the multiplexer component is configured to receive the replacement value and to receive the returned data value from the connection and under control of the finite state machine to provide either the returned data value received from the connection or the replacement value via the connection to the processor.

8. The SoC according to claim 7,
wherein the connection is realized as a bus connection between an instruction port of the processor and the non-volatile memory.

9. The SoC according to claim 7,
wherein the non-volatile memory is realized as a flash memory.

10. The SoC according to claim 7,
wherein the replacement value comprises a machine executable instruction which causes the processor to halt.

11. The SoC according to claim 7,
wherein the processor is configured to perform calculations for audio processing.

12. A headphone having the SoC according to claim 11.

13. The headphone according to claim 12,
wherein the headphone is realized as one of in-ear headphone, on-ear headphone or over-ear headphone.

14. A system-on-a-chip, SoC, without read only memory, ROM, comprising
a processor,
a non-volatile memory,
a connection which is configured to connect the processor and at least the non-volatile memory, and
a monitoring component,
wherein the processor is configured to receive a reset signal and to perform at least one read access to the non-volatile memory via the connection, and
wherein the monitoring component is configured to monitor the connection between the processor and the non-volatile memory, and upon occurrence of a first read access of the processor to the non-volatile memory to check whether a data value returned in response to the first read access via the connection conforms to a pre-set value, and if the returned data value differs from the pre-set value, to stop operation of the processor,
wherein the monitoring component comprises a finite state machine and a multiplexer component,
wherein the finite state machine is configured to start operating upon occurrence of the reset signal, to control the multiplexer component, to receive at least the returned data value from the connection, to evaluate the returned data value received from the connection and therefrom determine whether the first read access from the processor to the non-volatile memory has occurred and whether the returned data value conforms to the pre-set value, and if it is determined that the first read access occurred and the returned data value does not match the pre-set value, the finite state machine is configured to provide a replacement value to the multiplexer component, and
wherein the multiplexer component is configured to receive the replacement value and to receive the returned data value from the connection and under control of the finite state machine to provide either the returned data value received from the connection or the replacement value via the connection to the processor.

* * * * *